May 15, 1928.

G. E. REED

CAN OPENER

Filed March 30, 1927

1,670,211

George E. Reed
INVENTOR

BY Victor J. Evans
ATTORNEY

WITNESS:

Patented May 15, 1928.

1,670,211

UNITED STATES PATENT OFFICE.

GEORGE E. REED, OF PINE, ARIZONA.

CAN OPENER.

Application filed March 30, 1927. Serial No. 179,703.

This invention relates to can openers embodying among other characteristics penetrating members adapted to puncture a receptacle to discharge the contents thereof.

Another object of the invention comprehends a handle member for the penetrating members.

A further object of the invention contemplates means carried by the handle member and connected with a receptacle to provide a fulcrum for the handle.

More specifically stated the handle member is provided with a spring member to rock the handle member upon its fulcrum to position the penetrating members within the punctures in a receptacle to prevent accumulation of extraneous matter therein.

With the above and other objects in view, the invention further consists in the following novel features and details of construction to be hereinafter more fully described, illustrated in the accompanying drawing and pointed out in the appended claims.

In the drawing:—

Figure 1:
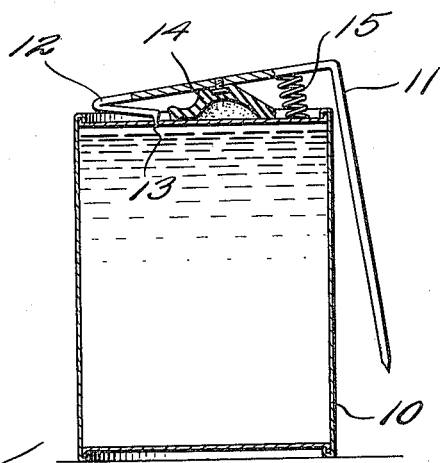
Figure 1 is a sectional view taken through a receptacle and the invention disposed for active use.

Referring to the drawing in detail, wherein like characters of reference denote corresponding parts, the reference character 10 indicates a receptacle of the conventional form. The receptacle in question is constructed in accordance with the receptacles presently used for containing condensed milk and cream.

In carrying out the invention I provide a substantially inverted L-shaped handle member 11 having the vertical leg thereof extending along one side of the can while the short leg thereof is disposed horizontally of the top. Semi-circular laterally disposed and reversely directed members 12 terminate to provide downwardly offset penetrating points 13, the purpose of which will be presently apparent.

A suction cup 14 carried upon the underside of the transverse leg for the handle member 11 is adapted for connection with the top of the receptacle and to provide a fulcrum for the handle member.

In the use and operation of the invention the suction cup is first compressed upon the top of a receptacle to eject air from the cupped portion thereof to define a vacuum chamber whereby said cup will adhere to the top. The handle member 11 is then tilted at the top as clearly illustrated in Figure 1 of the drawing and the semi-circular members 12 are then compressed or struck with smart blows to puncture the receptacle top with the offset penetrating points 13.

It will thus be noted that two punctures are made in the can, one for the discharge of the contents thereof and the other permits the ingress of air to eject said contents and relieve suction. A compression spring 15 is employed to normally hold and retain the handle member 11 in the position as best illustrated in Figure 1 of the drawing to close the punctures in the can top with the off-set penetrating points 13 to prevent accumulation of extraneous matter within the receptacle and polluting of the contents thereof.

Figure 2:
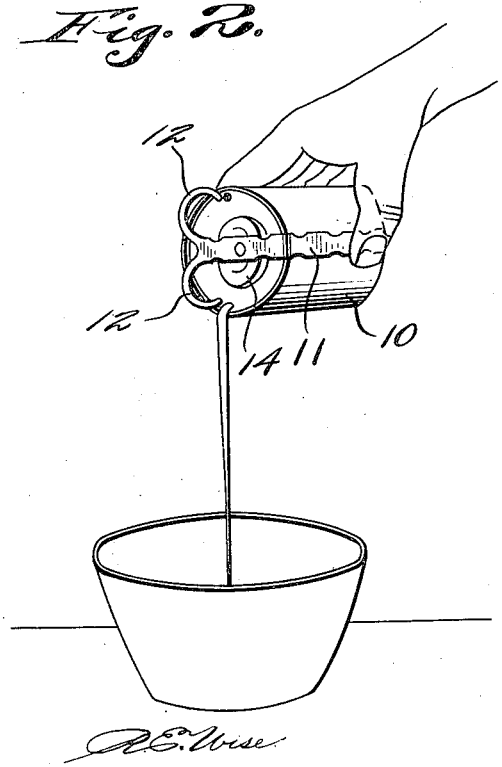
Figure 2 is a perspective of the invention when operated.

From the illustration in Figure 2 of the drawing the receptacle and handle member 11 may be grasped with one hand; the compressing of the handle member will rock the same upon its fulcrum, namely the suction cup 14, and remove the offset penetrating points 13 from the punctured portions of the receptacle top.

The invention is susceptible of various changes in its form, proportions and minor details of construction and the right is herein reserved to make such changes as properly fall within the scope of the appended claims.

Having described the invention, what is claimed is:

1. A can opener comprising a handle member, a suction cup carried thereby adapted for connection with the receptacle to provide a fulcrum for the handle member, penetrating elements carried by the handle member adapted to puncture the receptacle, and a spring member carried by the handle member engageable with the receptacle to rock the handle member upon the fulcrum to normally position the penetrating elements within the aforementioned punctures.

2. A can opener including a substantially inverted L-shaped handle member, semi-circular members laterally disposed upon the extremity of the horizontal leg for the handle member penetrating elements carried upon the extremities of the semi-circular members adapted to puncture the receptacle, a suction cup carried by the horizontal leg adapted for connection with the receptacle to provide a fulcrum for the handle member, and a compression spring carried by the handle member engageable with the receptacle to normally position the penetrating elements within the punctures.

In testimony whereof I affix my signature.

GEORGE E. REED.